(12) United States Patent
Smithies

(10) Patent No.: US 6,752,847 B2
(45) Date of Patent: Jun. 22, 2004

(54) HIGH TEMPERATURE POLYMER FILTRATION MEDIUM

(75) Inventor: Alan Smithies, Overland Park, KS (US)

(73) Assignee: BHA Group Holdings, Inc., Kansas City, MO (US)

( * ) Notice: Subject to any disclaimer, the term of this patent is extended or adjusted under 35 U.S.C. 154(b) by 0 days.

(21) Appl. No.: 10/000,236

(22) Filed: Nov. 30, 2001

(65) Prior Publication Data
US 2003/0110745 A1 Jun. 19, 2003

(51) Int. Cl.[7] .............................................. B01D 39/14
(52) U.S. Cl. ............................ 55/521; 55/524; 55/528; 210/493.1; 210/506; 442/136
(58) Field of Search .......................... 55/521, 522, 524, 55/528, 341.1; 210/500.39, 506, 493.1; 442/136, 164

(56) References Cited

U.S. PATENT DOCUMENTS

| | | | |
|---|---|---|---|
| 4,070,519 A | * | 1/1978 | Lefkowitz et al. .......... 442/190 |
| 4,877,433 A | | 10/1989 | Oshitari |
| 4,925,601 A | | 5/1990 | Vogt et al. |
| 5,096,473 A | * | 3/1992 | Sassa et al. ................ 95/282 |
| 5,230,455 A | | 7/1993 | Price |
| 5,246,474 A | | 9/1993 | Greatorex |
| 5,296,065 A | | 3/1994 | Greatorex |
| 5,318,831 A | | 6/1994 | Hirama et al. |
| 5,480,547 A | | 1/1996 | Williamson et al. |
| 5,507,847 A | | 4/1996 | George et al. |
| 5,558,689 A | | 9/1996 | Yanagihara et al. |
| 5,690,873 A | | 11/1997 | Harwood et al. |
| 5,730,766 A | | 3/1998 | Clements |
| 5,733,657 A | * | 3/1998 | Macheras et al. ........... 428/398 |
| 5,766,486 A | | 6/1998 | Cathcart et al. |
| 5,806,154 A | | 9/1998 | Tolbert |
| 5,925,581 A | | 7/1999 | Tolbert |
| 6,008,146 A | | 12/1999 | Stark |
| 6,015,499 A | | 1/2000 | Hayden |
| 6,110,249 A | | 8/2000 | Medcalf et al. |
| 6,203,591 B1 | | 3/2001 | Clements et al. |
| RE37,163 E | | 5/2001 | Oussoren et al. |
| 6,228,477 B1 | | 5/2001 | Klare et al. |
| 6,233,790 B1 | | 5/2001 | Carothers |
| 6,409,785 B1 | * | 6/2002 | Smithies et al. .............. 55/486 |

FOREIGN PATENT DOCUMENTS

| | | | |
|---|---|---|---|
| EP | 0726348 A1 | * | 8/1996 |
| JP | 8-131735 A | * | 5/1996 |
| JP | 2000-70629 A | * | 3/2000 |

* cited by examiner

Primary Examiner—Frank M. Lawrence
(74) Attorney, Agent, or Firm—Blackwell Sanders Peper Martin LLP (57) ABSTRACT

A filter medium for use in particulate filtering applications is disclosed. The filter medium is formed from a substrate capable of retaining the desired physical structure of the filter medium under the conditions of the filtering application, including temperature. A polyimide based stiffening agent adapted for treating the substrate is also provided.

17 Claims, 6 Drawing Sheets

HIGH TEMPERATURE POLYMER FILTRATION MEDIUM

FIELD OF THE INVENTION

The present invention relates to a high temperature polymer resin for use as a stiffening agent for a filtering medium. More specifically, a polyimide treated pleated filter medium for use in a high temperature industrial particulate filter apparatus is disclosed.

BACKGROUND OF THE INVENTION

A technique for controlling pollutants and emissions from industrial plants is to remove undesirable particulate matter carried in a gas stream by fabric filtration. Such fabric filtration is accomplished in a particulate matter or dust collection apparatus known in the industry as a "baghouse". The fabric filter is preferably pleated to increase the effective filtering area while occupying the same or less space. The improved baghouse illustrated herein includes two large chambers, or plenums, that are divided by a tube sheet having a plurality of openings for receiving air filter cartridges.

The filter cartridges include a pleated filter medium that retains the unwanted particles as the air is forced through the cartridge. Traditional dust filtration materials are made from woven or needlepunch media. Newer filters, including higher surface area pleated media, are made from spunbond or other nonwoven media. The effectiveness of the filters diminishes as particles collect on the outer surfaces of the filters, thereby diminishing air flow. To remove accumulated particles on the filters without physically removing the filters from the baghouse, air may be pulsed through the baghouse cartridge filters from the opposite direction of air flow during particulate removal. The reverse pulses abruptly and temporarily expand the filter media to dislodge the particles, which fall to the bottom of the baghouse and are removed. The effectiveness of the baghouse is greatly increased without having to repeatedly remove and replace the cartridges Unfortunately, there are limitations associated with the use of pleated filter media. First, the pleated structure is sensitive to temperature. Complications arise when these media are being processed and manufactured at temperatures similar to the temperatures used in the baghouse during filtering applications. The higher temperature causes the media to soften, allowing a level of pleat collapse or pleat pinch to occur. Pleat collapse can restrict air flow and cause increased pressure drop minimizing the advantages of the higher filter surface area of the pleats. For this reason, the use of polymer filter media for use at higher temperatures has been limited. (For purposes of this disclosure, high temperature is meant to include but is not limited to filtering applications ranging from about 300° to about 500° F., with surge temperatures typically reaching about 550° F.)

There are several primary fibers or polymers, processed into fabrics and used in the 300° to 550° F. range. Traditionally they are polyphenylene sulphide (PPS, with trade names such as Ryton®, Torcon® and Procon®) and aramid (Nomex®, Conex®) both of which operate up to but preferably below 400° F. Applications operating at temperatures greater than 400° F. and up to 550° F. typically utilize fibers of glass, polyimide (P84) or PTFE (Teflon®, Profilen®, Rastex®). For this reason the selection of the substrate fiber or resin is in part determined by the conditions under which the filter will be used.

Second, the abrupt expansions from reverse pulse cleaning procedure places additional stress on the filter media. The stress results in cracking of the resin or stiffening agent, discussed below, thereby shortening the effective filter life. As the tensile and tear strength of the stiffening agent are lessened, the media tend to crack, split and/or tear, leading to the escape of unfiltered emissions through the tears. Thus, the combination of stresses due to the inward filtering flow and outward cleaning pulses reduce the effective filter life typically to six months or less when operated twenty four hours/seven days a week at a temperature of 350° F. to 400° F.

Conventional polymer filtering materials, including PPS based filtering material, has heretofore been treated with stiffening agent resin systems applied in a secondary process. The stiffening resins impregnate the substrate to strengthen and stabilize the filter, as well as aiding in pleating and pleat retention. These known stiffening resins include emulsions and/or dispersions of bisphenol based epoxies, acrylic based resins, melamine and phenol formaldehyde resins. These resins are commonly used in the textile industry and are recommended for use with textile products exposed to high temperatures. They are applied to impart the necessary features to allow the media to pleat and retain its form and shape at the desired application temperatures. The resins are typically applied via an impregnation process, where the media is totally immersed in a bath of the specified resin solution and then nip squeezed to remove the excess solution prior to drying. After drying the media is rendered stiff. The media is measured to ensure the correct level of resin has been applied, typically 10% to 25% add on to the basis weight of the base or substrate medium.

These conventional resins are not fully cross-linked or cured when initially dried onto the fabric. This allows the media to re-soften during subsequent high temperature processes, specifically the pleating process, where the softening allows the fabric to conform to the pleating action. After subsequent cooling the resin helps maintain the pleat structure. Unfortunately, upon initial exposure to elevated temperatures during filtering applications the media softens, and does not fully cure and re-stiffen for up to several hours. Once fully cured, the fabric is better able to withstand the rigors of reverse air pulsing, at low temperatures, without losing shape and form. However, pleat collapse or pinching can occur while the material is soft prior to curing. These resins that cure in two stages are called "B" staged resins. The initial drying and partial curing is commonly known as "B-curing", followed by a complete or final curing.

While these stiffening agent resins render the treated filter fabric pleatable, conventional resins cannot withstand the mechanical wear and rigors of reverse air pulse cleaning, as these resins tend to crack. Commercially available filter media typically have a life expectancy, dependent on conditions, of about six months, due to the thermal and mechanical wear on the stiffening resin.

It is therefore desirable to provide a polymer stiffening agent capable of withstanding the temperature and cleaning pulses of high temperature industrial baghouses, and to provide a pleated filter medium utilizing the improved polymer stiffening agent

SUMMARY OF THE INVENTION

The present invention is directed to an improved polymer stiffening resin for use with a filtering medium. The stiffening resins of the present invention are polyimide (PI) based resins. Polyimides are a generic class of condensation polymers containing an 'imide' linkage as a linear or heterocyclic unit along the polymer backbone.

In a preferred embodiment the polyimide stiffening resins are applied to woven and non-woven polymer substrates to form pleated filter media. The non-woven substrates are calendered, and both types of substrates are immersion coated with the polyimide stiffening resin. The improved filter media of the present invention are especially well suited for use in applications at temperatures exceeding 300° F., such as industrial baghouse filtering applications.

The present invention is also directed to a method of making the filter medium of the present invention. A preferred method comprises calendering a substrate; treating the calendered substrate with a polyimide stiffening agent; and curing the treated substrate.

DETAILED DESCRIPTION

Figure 1:
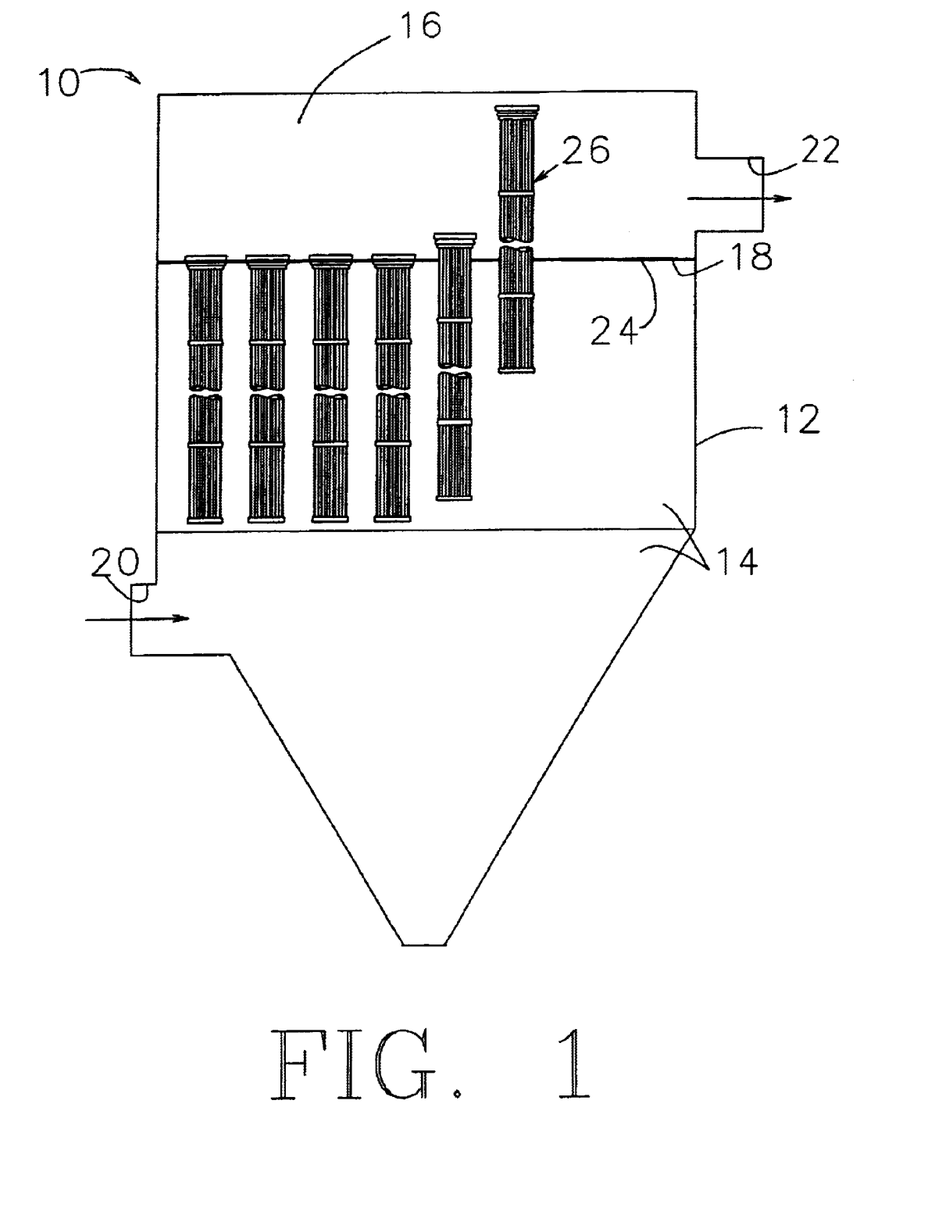
FIG. 1 is a schematic view, partly in section, of a baghouse shown with filter assemblies containing the improved pleated filter medium of the present invention installed.

An improved polymer stiffening agent adapted for using the pleated filter media of the present invention is shown in FIG. 1, and is disclosed in U.S. Pat. No. 6,203,591 B1 to J. T. Clements et al., incorporated herein by reference. This baghouse is for purposes of illustration only, and is not meant to limit the use of the present invention to this particular baghouse. The baghouse, generally designated 10, is defined by an enclosed housing 12 that is divided into a "dirty air" plenum 14 and a "clean air" plenum 16 by a tubesheet 18. A dirty air inlet port 20 is in fluid communication with the dirty air plenum 14 and a clean air outlet port 22 is in fluid communication with clean air plenum 16. The tubesheet 18 includes a plurality of openings 24 sized to accept and retain a plurality of filter assemblies generally designated 26, as shown.

Figure 2:
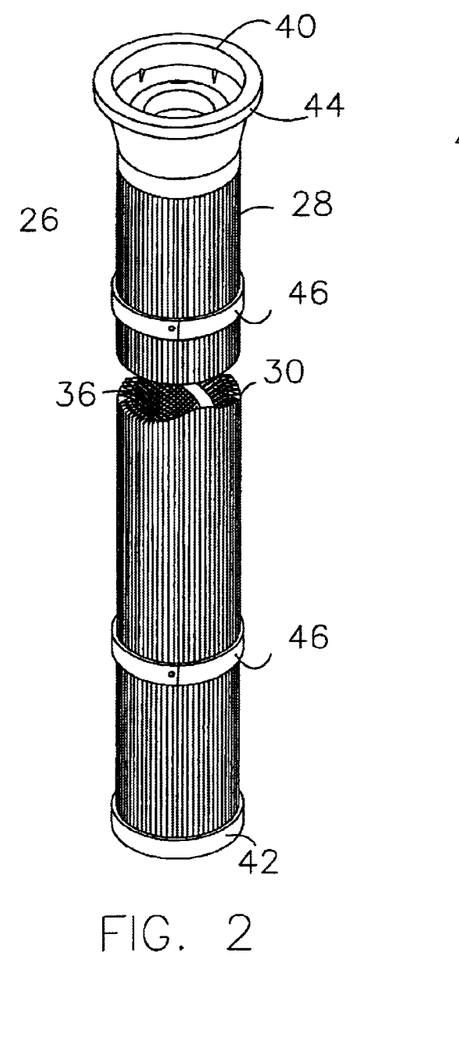
FIG. 2 is a perspective, enlarged sectional view of the filter assembly illustrated in FIG. 1.
Figure 3:
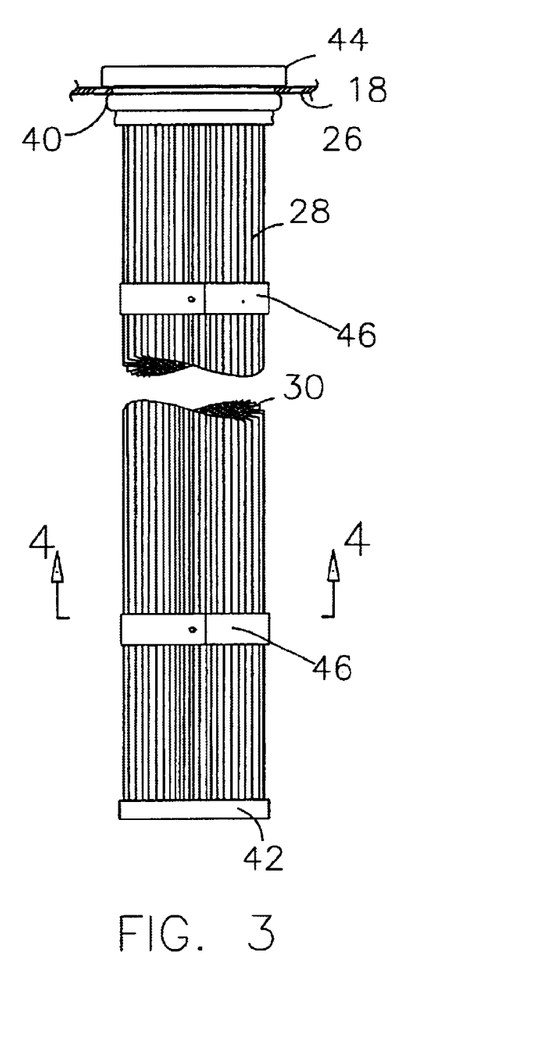
FIG. 3 is an elevational view of the filter assembly of FIG. 2.
Figure 4:
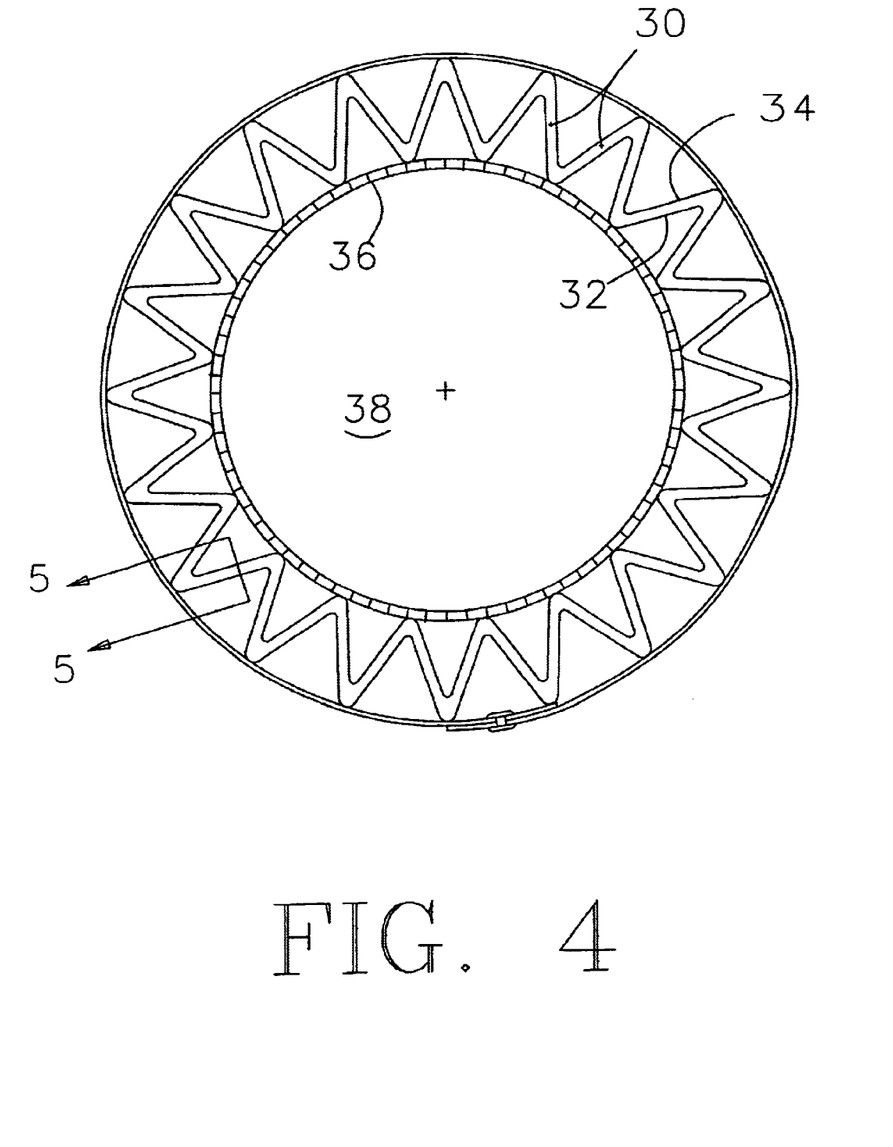
FIG. 4 is a cross-sectional view of the filter assembly of FIG. 3 taken along line 4—4 of FIG. 3.

A filter cartridge 26 adapted for use with the present invention is illustrated in FIGS. 2–4. The filter cartridge 26 includes a fabric filter 28 that is generally tubular and includes a number of pleats 30. The pleats have in inner surface 32 and an outer surface 34. In a preferred embodiment, pleats 30 abut an inner screen 36 defining a central passageway 38 formed within filter cartridge 26. The fabric filter 28 and screen 36 are aligned and held in place by an upper cap 40 and a lower cap 42. Upper cap 40 includes a projecting shoulder 44 that holds the cartridge in place against tubesheet 18 and prevents the cartridges from falling through openings 24. The assembly 26 is further strengthened by a fabric strap 46, described in more detail in U.S. Pat. No. 6,233,790 B1 incorporated herein by reference.

In operation, the dirty air enters dirty air plenum 14 through inlet port 20 and is filtered through the filter assemblies 26. As the air moves through the filter media 28 into the central passageway 38 particles are trapped against outer surface 34. The cleaned air then exits passageway 38 into the clean air plenum 16 and is removed from baghouse 10 through outlet port 22, as shown by the arrows in FIG. 1. As the filtered particles build up against the outer surface 34 of filter 28, the efficiency of baghouse 10 decreases. In order to remove the particles, air is pulsed in the reverse direction of airflow during the filtering application. Air is pulsed at a desired rate to maintain the desired airflow during filtering application. The reverse pulse "blows" the particles off the outer surface 34 of filter 28. The particles fall to the bottom of dirty air plenum 14 and can be removed.

While the illustrated baghouse, cartridge and strap are preferred, it is understood that any suitable baghouse, cartridge and/or strap design may be utilized with the present invention. Further, the filter medium described below can be used in other filtering configurations.

The filter media of the present invention is comprised of a substrate, for example a polymer needlefelt medium, that has been impregnated with a polyimide resin stiffening agent. The polyimide stiffening resin provides increased fiber strength and stabilization for pleat retention and structural integrity during filtering and pulse cleaning, especially when used in higher temperature applications.

The stiffening resins of the present invention are polyimide (PI) based resins Polyimides are a generic class of condensation polymers derived from bifunctional carboxylic acid anhydrides and primary diamines. They contain an 'imide' linkage, —CO—NR—CO—, as a linear or heterocyclic unit along the polymer backbone. The heterocyclic structure is usually present as a five or six membered ring condensed with benzene (phthalimides) or naphthalene (naphthalimides).

Polyimides include but are not limited to the generic classes of polyamideimides (PAI), polyetherimides (PEI) and polybismaleimides (PBMI). PAI's are high performance polymers containing both the 'imide' linkage and 'aminde' (—CO—NH—) linkages in the polymer backbone. PAI resins are produced by solution condensation of aromatic trichlorides with aromatic diamines. PEI's are condensation polymers produced from reactions of bisphenols and dinitrobisimides. PEI polymers contain both the 'imide' and 'ether' (—O—) linkages in the polymer backbone. The ether linkage improves ease of processing and flexibility. PBMI's are generally prepared from the two-step reaction of maleic anhydride and diamines in the presence of acetic anhydride and catalytic amounts of nickel acetates and triethylamine. Polyimides include both thermoset and thermoplastic polymers that can be 'engineered' to suit specific end-use performance requirements.

Compared with conventional resins they are significantly more expensive, but do offer the required increased thermal resistance properties necessary for withstanding temperatures ranging from 500° F. up to 700° F. Further, the glass transition temperatures (Tg's) of these resins/polymers are greater than the maximum operating temperature in an industrial baghouse which is typically 500° F. These resins are known to retain good structural integrity while operating at higher temperatures for extended periods of exposure while maintaining the required chemical resistance and tensile strength needed. In addition, these resins have excellent resistance to stretch or creep at elevated temperatures and are extremely flame retardant. Polyimides are available as both organic or water based solutions.

A class of polyimide, PAI is discussed for purposes of illustration but is in no means meant to be limiting. A preferred PAI resin is formulated by the following reaction pathway:

The preferred PAI shown above is a thermoplastic polymer with a Tg of 540° F. It is flame resistant, with an LOI (limiting oxygen index) of 45%, has low smoke generation and is primarily a water-base system. Although there is a small quantity of solvent found in this PAI formulation, it does not need special processing equipment. Traditional nonwoven wet chemical processing equipment to control ventilation and exhaust is adequate, and special solvent recovery systems are not necessary. This helps to hold down the cost of using these types of resins, allowing these resins to be processed by existing media vendors and afforded by the dust pollution control industry.

The polyimide stiffening agent of the present invention may be utilized in combination with any substrate capable of withstanding the conditions of the particular filtering application. In high temperature applications, acceptable polymer substrates include but are not limited to polyarylene sulfide, polyimides, aramids, polyamides, glass and mixtures or blends thereof. A substrate that is particularly well suited for high temperature applications is a blend of polyphenylene sulfide (PPS), which is a subclass polyarylene sulfides, with greater than 10% aramid, polyimido, acrylic, pre-oxidized acrylic or similar polymer, and mixtures thereof.

Another suitable substrate is an aramid fiber medium. Commercially available aramid based products are most often made from 100% aramid fiber needlefelts that are resin stiffened with conventional resins as is disclosed above. Aramid polymers and blends thereof are generally selected when a high temperature gas stream needs to be cleaned with temperatures in the range of 300° F. to 400° F.

A 2% to 20% weight pick up of the polyimide resin is preferred, with 6% to 10% more preferred. Most preferred is a 6% to 7% weight pick up of the preferred PAI on the polymer needlefelt media, which is sufficient to allow pleating and pleat retention. This improves over conventional stiffening agents, available as emulsions and dispersions, that require 10% to 25% weight pick up to achieve the same stiffness. The reduction in the weight pick up required by the polyimide resins provides a superior stiffening agent and renders the polyimide resins more economical.

The polyimide resins provide sufficient stiffness at lower weight pick ups primarily due the following: First, the polyimide resin is in solution, rather than an emulsion or dispersion. This allows a thinner, more uniform impregnation of the substrate with the polyimide resin.

Second, the polymer needlefelt is calendered under heat and pressure to attain the thickness and air permeability properties needed from the final filter media. In a preferred embodiment the media is calendered after singeing but prior to application of the stiffening resin to prevent cracking of the stiffening resin. Calendering the substrate prior to application of the stiffening agent contributes to the uniformity of stiffening resin at lower weights than are required with traditional stiffening resins.

The polyimide resin may be applied to the substrate by immersion coating. The substrate is fed into a coating tank and dip coated in the resin solution to impregnate both sides of the substrate. The media passes between two nip rolls to remove the excess and enters a drying oven where the polyimide resin is substantially cured.

A further advantage of the polyimide resin is the fact that it is available in a solution, rather than an emulsion or dispersion such as the prior art resin. In the prior art, the emulsion or dispersion that is removed by the nip rolls during the immersion coating processs is diluted, as the resin is trapped in the substrate. Since the polyimide resin is in solution, the solution maintains a constant concentration.

In the preferred embodiment the treated substrate is then pleated by any suitable method, including a blade or push bar pleater. Due to the higher Tg of polyimides, the temperature during pleated is raised to approximately 430° F. dependent on the particular polyimide used, as is well known in the art.

In an alternate embodiment, these types of media can be laminated with expanded microporous PTFE, as is known in the art, to impart an improved level of filtration performance to the woven or non-woven filter medium. This requires a level of further processing to allow the media to bond to the PTFE membrane. In another alternate embodiment the polymer substrate may be formed around a support scrim, such as PTFE. Both of these processes are well known in the art

EXAMPLE 1

A 10.0 oz unsupported aramid (Nomex) media, supplied by Southern Felt Co. of North Augusta, S.C. was produced by known methods. The fibers were processed into a felt and both sides were singed and calendered by conventional methods prior to resin application. The 2376 PAI resin solution was supplied by Whitford Inc., West Chester, Pa. at 11.0% solids, 10% NMP and 79% water and additional trace components including surfactants. The 2376 resin solution was diluted to 5.5% solids using water at a 1:1 ratio. The felt was immersed in the resin and the excess removed by nip rollers to produce a 6% to 7% pickup after the first pass. The treated media was dried at 425° F. and pleated by conventional means, although the temperature was increased to about 430° F. on the exit platens due to the high Tg of PAI.

Figure 5:
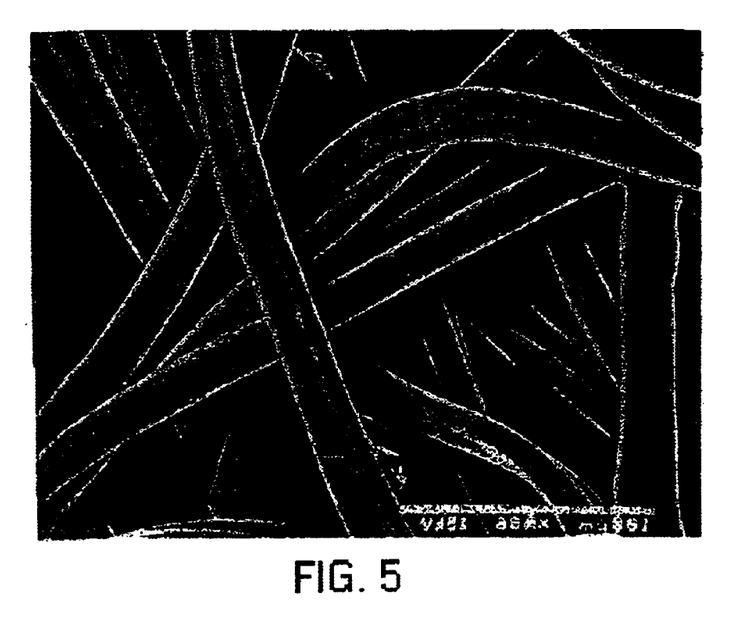
FIG. 5 is an SEM (scanning electron microscope) photograph of a non-woven aramid polymer substrate treated with the preferred polyimide stiffening resin of the present invention.

A SEM photo of the aramid substrate treated with the preferred PAI is shown in FIG. 5. It is apparent that the PAI resin has coated the fibers individually and consistently, as the fiber structure is apparent. For purposes of comparison, an SEM photo of an aramid substrate treated with a conventional epoxy would be expected to illustrate that the epoxy had collected more heavily in the voids between the fibers. The concentrations of epoxy not associated with a fiber would be easily 'blown' off the filter medium resulting in an immediate drop in stiffness and pleat stability.

The PAI treated aramid filter was tested in a full scale test baghouse under industrial conditions. The test baghouse is fully automated and simulates industrial conditions at a constant temperature, 375° F., 1200 cfm (4:1 a/c), 60 psi with dust loading. The pressure drop was constant, ranging between 2.8 and 3.6 inches. The filters were removed at 30,000, 50,000 and 110,000 pulses. The results of these tests are shown in the Table 1. Most notably, the data shows that after 110,000 pulses the media with the preferred resin still had 90% of its original strength. The simulated baghouse testing indicates at 110,000 pulses there is more than 12 months simulated life on these filters. Further, the test data indicates the PAI resin is more stable and suitable at withstanding the forces and temperatures expected of the media and can be extrapolated to suggest it will also be in good condition after 200,000 pulses or the equivalent of two years life while operating on a twenty-four hour/seven day a week basis.

TABLE 1

ThermoPleat Analysis-BEST Tested Media

| Property | Units | Zero Pulses | 30,000 Pulses | 50,000 Pulses | 110,000 + Pulses |
|---|---|---|---|---|---|
| Basis Weight-Dirty Top | oz/sq.yd | n/a | 12.4 | 14.9 | 16.7 |
| Basis Weight-Dirty Bottom | oz/sq.yd | n/a | 11.6 | 12.5 | 12.3 |
| Basis Weight-Clean Top | oz/sq.yd | 10.5 | 11.0 | 11.4 | 12.7 |
| Basis Weight-Clean Bottom | oz/sq.yd | 10.5 | 10.8 | 11.6 | 11.8 |
| Thickness-Clean | inches | 0.046 | 0.049 | 0.055 | 0.050 |
| Air Perm. Dirty Top | cfm | n/a | 4.99 | 7.1 | 4.6 |
| Air Perm. Dirty Bottom | cfm | n/a | 8.60 | 12.1 | 10.4 |
| Air Perm. Clean Top | cfm | 29.0 | 28.5 | 25.7 | 20.8 |
| Air Perm. Clean Bottom | cfm | n/a | 26.5 | 20.0 | 20.0 |
| MD Tensile Strength | lbs/2" | 188.5 | 199.5 | 181.3 | 178.0 |
| XMD Tensile Strength | lbs/2" | 311.5 | 314.7 | 294.0 | 292.0 |
| MD Elong'n at break | % | 57.8 | 37.2 | 40.4 | 29.8 |
| XMD Elong'n at break | % | 51.0 | 42.5 | 35.1 | 34.5 |
| MD Tear Strength | lbs | 23.0 | 11.25 | 11.91 | 11.8 |
| XMD Tear Strength | lbs | 11.0 | 7.9 | 7.5 | 6.9 |
| Retained MD Tensile | % | 100 | 100 | 96.2 | 94.4 |
| Retained XMD Tensile | % | 100 | 100 | 94.4 | 93.7 |
| Prior Resin Tensile | % | 100 | 50 | 20 | |
| Retained MD Tear | % | 100 | 49.0 | 51.8 | 51.3 |
| Retained XMD Tear | % | 100 | 71.8 | 68.2 | 62.8 |
| Prior Resin Tear | % | 100 | 35 | 10 | |

Figure 7:
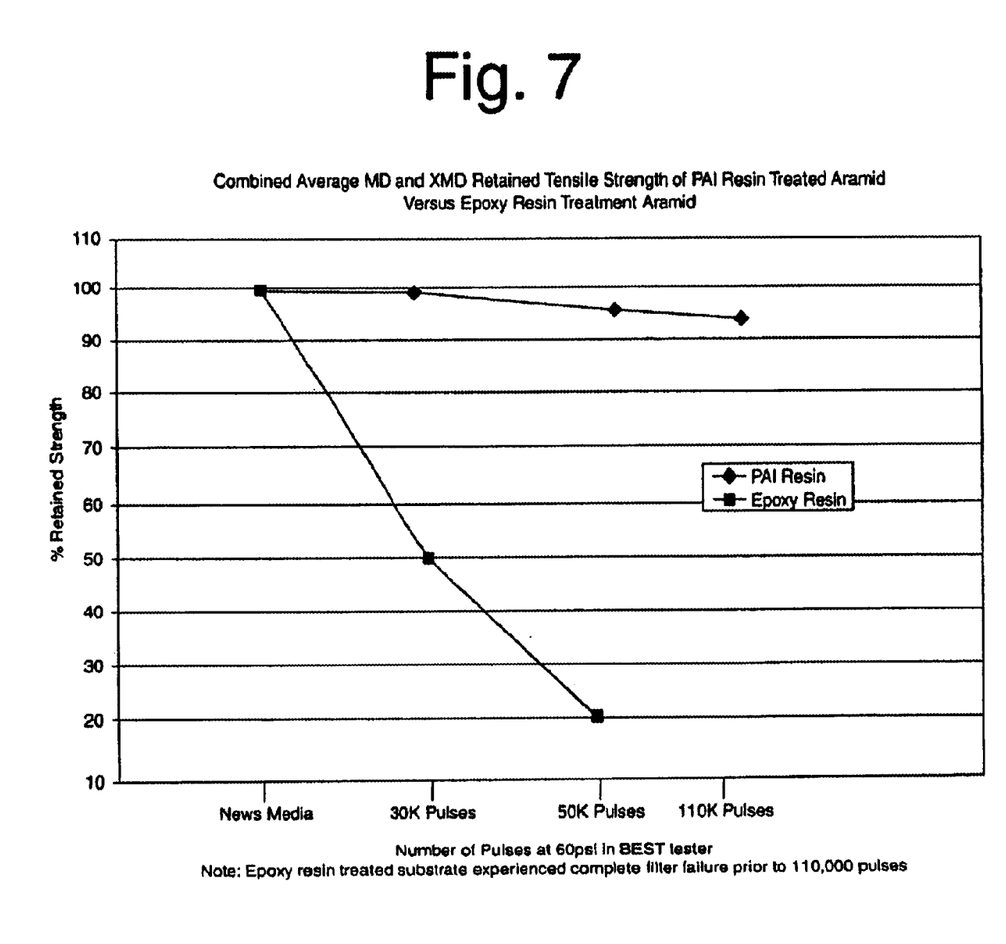
FIG. 7 is a graph entitled "Combined Average MD and XMD Retained Tensile Strength of PAI Resin Treated Aramid versus Epoxy Resin Treated Aramid"
Figure 8:
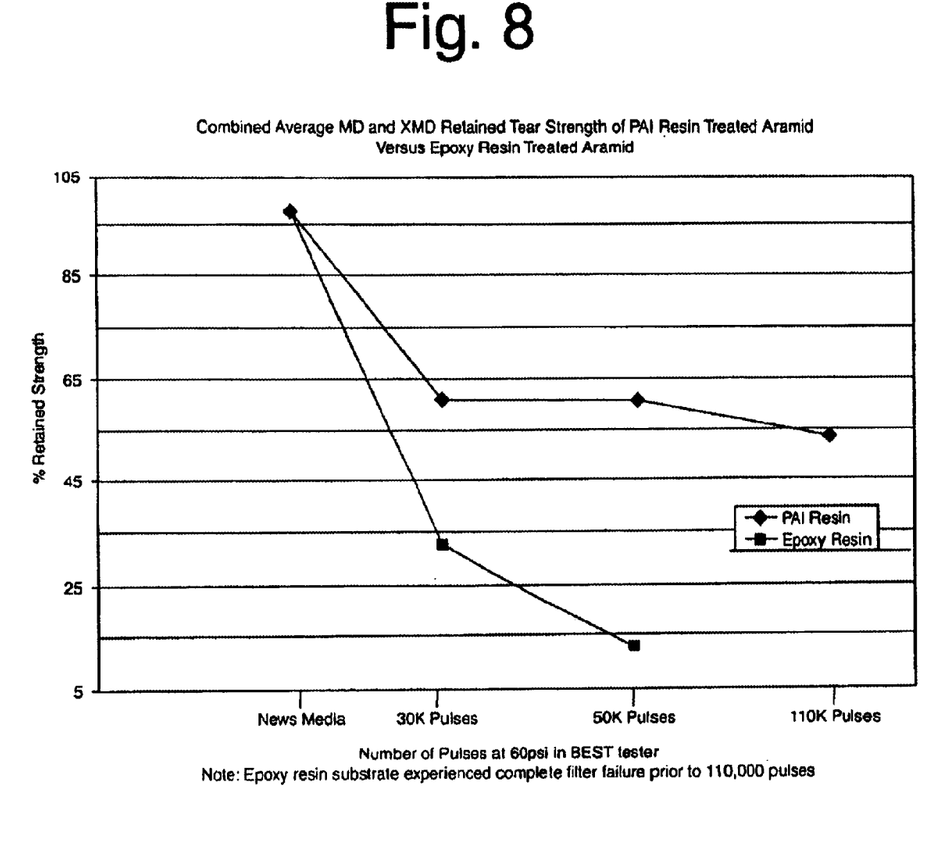
FIG. 8 is a graph entitled 'Combined Average MD and XMD Retained Tear Strength of PAI Resin Treated Aramid versus Epoxy Resin Treated Aramid"

The combined average tensile strength and the combined average tear strength of the PAI resin treated aramid substrate as compared to an aramid substrate treated with a conventional epoxy resin is shown in FIGS. 7 and 8, respectively. As is noted, the epoxy resin treated aramid substrate experienced a total filter failure prior to 110,000 pulses.

The improved resin treated aramid was flame tested and compared to conventional stiffening agents. Flammability Testing in accordance with FTMS 191A-Method 5903 is shown in Table 2. As is seen, the PAI treated aramid exhibits excellent flame retardation.

TABLE 2

Flammability Testing
Testing in accordance with FTMS 191A - Method 5903

|  | PAI Coated Aramid | PAI Coated PPS/Polyimide |
|---|---|---|
| After Flame (secs) MD | 0.0 | 2.6 |
| XMD | 0.0 | 3.4 |
| After Glow (secs) MD | 0.0 | 0.0 |
| XMD | 0.0 | 0.0 |
| Char Length (in) MD | 1.8 | 2.9 |
| XMD | 2.0 | 2.9 |

An 11.0 oz unsupported filter medium of 75% PPS and 25% polyimide, supplied by Southern Felt Co. of North Augusta, S.C., was produced by known methods. The fibers were processed into a felt and both sides were singed and calendered by conventional methods prior to resin application. The 2376 PAI resin was supplied by Whitford Inc., West Chester, Pa. at 11.0% solids, 10% NMP and 79% water. The 2376 resin solution was diluted to 5.5% solids using water at a 1:1 ratio. The felt was immersed in the resin and the excess removed by nip rollers to produce a 6% to 7% pickup after the first pass. The treated media was dried at 400° F. and pleated by conventional means, although the temperature was increased to about 430° F. on the exit platens due to the high Tg of PAI.

Figure 6:
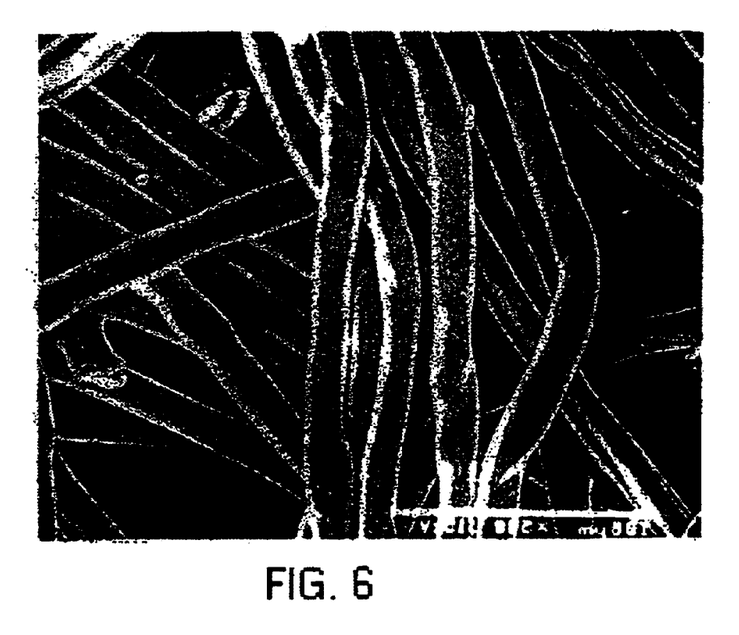
FIG. 6 is an SEM photograph of a non-woven PPS/polyimide polymer substrate treated with the preferred polyimide stiffening resin of the present invention.

An SEM photo of the PPS/polyimide substrate treated with the preferred PAI is shown in FIG. 6. It is apparent that the PAI resin has coated the fibers individually and consistently, as the fiber structure is apparent.

The improved resin treated aramid was acid cycling testing, the results are shown in the graph of FIG. 7. Flammability Testing in accordance with FTMS 191A-Method 5903 is shown in Table 2 of FIG. 8.

All flammability testing was accomplished by Textile Technology Centre in St. Hyacinthe, Quebec.

The presently preferred embodiments have been described, however, many variations are possible. As noted above, the polyimide treated polymer substrate filter of the present invention may be advantageously used with the illustrated baghouse, however, the present invention may be used with any suitable baghouse or filtering apparatus. Moreover, although the stiffening resin of the present invention is particularly advantageous when used with a pleated filter medium, the invention is equally applicable to filter media of varying structures and applications, such as woven glass.

The stiffening resin of the present invention has been shown in combination with a non-woven polymer filtering substrate. However, any substrate, woven or non-woven, that satisfies the filtering requirements of the particular filtering application may be used.

While the filtering medium of the present invention overcomes the limitations of high temperature filtering applications, the present invention may also be used in lower temperature applications.

Having described the invention in detail, those skilled in the art will appreciate that modifications may be made of the invention without departing from its spirit and scope. Therefore, it is not intended that the scope of the invention be limited to the specific embodiments described. Rather, it is intended that the scope of the invention be determined by the appended claims and their equivalents.

What is claimed is:

1. A filter medium for use in a filtering application at an application temperature, the filter medium comprising:
    a polymer substrate capable of retaining a physical structure at the application temperature; and
    a stiffening agent consisting of a polyimide adapted for treating the polymer substrate and applied thereto, wherein the polymer substrate with applied stiffening agent is capable of withstanding at least 100,000 cleaning pulses at the application temperature.

2. The filter medium of claim 1 wherein the polymer substrate is selected from the group consisting of polyarylene sulfides, aramides, glass, polyimides, acrylics, pre-oxidized acrylics and mixtures thereof.

3. The filter medium of claim 1 wherein the substrate comprises polyphenylene sulfide.

4. The filter medium of claim 1 wherein the physical structure is a pleated structure.

5. The filter medium of claim 1 wherein the polyimide is selected from the group consisting of polyamideimides, polyetherimides, and polybismaleimides and mixtures thereof.

6. The filter medium of claim 1 wherein the stiffening agent consisting of a polyimide is about 2% to about 20% by weight of the total weight of the filter medium.

7. The filter medium of claim 1 wherein the application temperature is greater than about 375° F.

8. A filter medium for use in a filtering application at an application temperature, the filter medium comprising:
    a polymer substrate capable of retaining a pleated structure at the application temperature;
    a plurality of pleats formed into the polymer substrate at a temperature that is higher than the application temperature; and
    a stiffening agent consisting of a polyimide adapted for treating the polymer substrate.

9. The filter medium of claim 8 wherein the polymer substrate is selected from the group consisting of polyarylene sulfides, aramides, glass, polyimides, acrylics, pre-oxidized acrylics and mixtures thereof.

10. The filter medium of claim 8 wherein the polymer substrate comprises polyphenylene sulfide.

11. The filter medium of claim 8 wherein the polyimide is selected from the group consisting of polyamideimides, polyetherimides, and polybismaleimides and mixtures thereof.

12. The filter medium of claim 8 wherein the stiffening agent consisting of a polyimide is about 2% to about 20% by weight of the total weight of the filter medium.

13. The filter medium of claim 8 wherein the application temperature is greater than about 375° F.

14. A filter medium for use in a filtering application at an application temperature, the filter medium comprising:
    a polymer substrate capable of retaining a pleated structure at the application temperature;
    a plurality of pleats formed into the polymer substrate at a temperature that is higher than the application temperature; and
    a stiffening agent consisting of a polyamideimide adapted for treating the polymer substrate.

15. The filter medium of claim 14 wherein the polymer substrate is selected from the group consisting of polyarylene sulfides, aramides, polyimides, acrylics, pre-oxidized; acrylics and mixtures thereof.

16. The filter medium of claim 14 wherein the polymer substrate comprises polyphenylene sulfide.

17. The filter medium of claim 14 wherein the application temperature is greater than about 375° F.

* * * * *